April 16, 1946.  C. A. EDSTROM  2,398,700
SPRING GROUP
Filed Jan. 23, 1943  2 Sheets-Sheet 1

INVENTOR.
Carl A. Edstrom
Atty.

April 16, 1946.   C. A. EDSTROM   2,398,700
SPRING GROUP
Filed Jan. 23, 1943   2 Sheets-Sheet 2
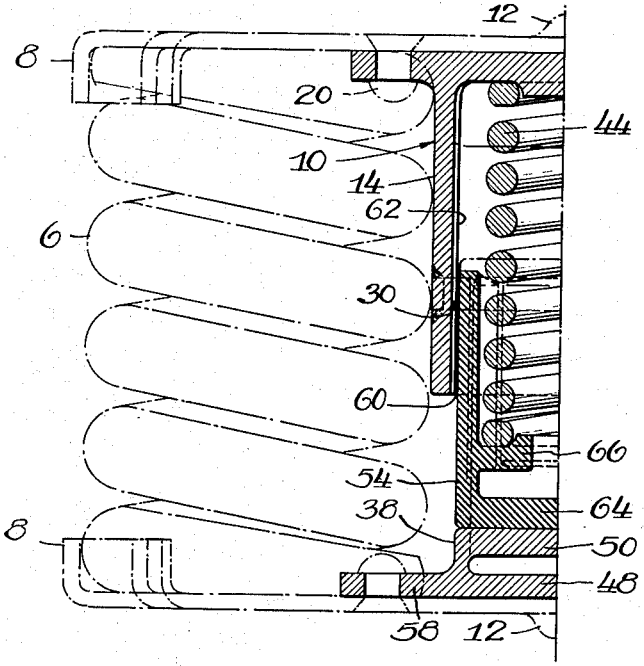
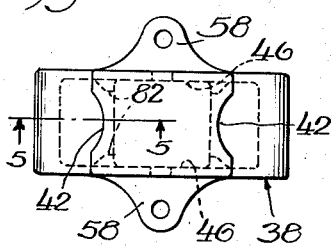
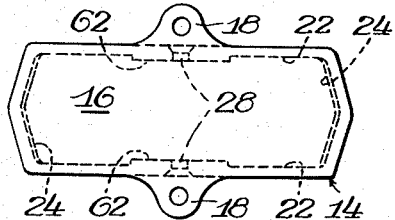
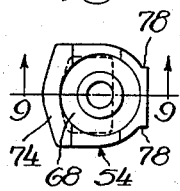
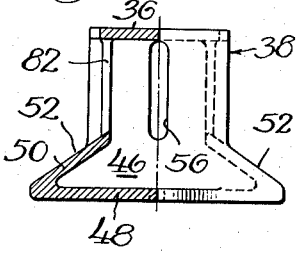
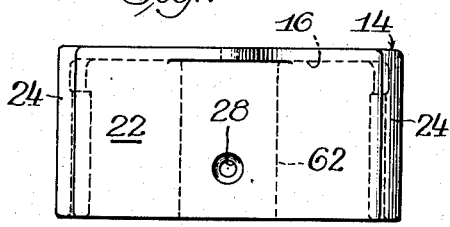
INVENTOR.
Carl A. Edstrom Patented Apr. 16, 1946

2,398,700

UNITED STATES PATENT OFFICE 2,398,700

SPRING GROUP

Carl A. Edstrom, Chicago, Ill., assignor to American Steel Foundries, Chicago, Ill., a corporation of New Jersey Application January 23, 1943, Serial No. 473,293

12 Claims. (Cl. 267—9)

My invention relates to a spring group and is illustrated in a form commonly utilized in railway equipment and as comprising a plurality of coil springs together with a friction device serving as control means for said springs.

The general object of my invention is to devise a novel form of spring group comprising one or more coil springs and a friction device which will be capable of developing a satisfactory amount of friction and will be relatively easy to assemble, while at the same time complying with the various practical considerations necessarily involved in its manufacture.

A more specific object of my invention is to devise such a spring group comprising a snubbing arrangement of novel form and including top and bottom followers supporting therebetween friction shoes engaging both of said followers, as well as auxiliary resilient means affording some control of the character of friction developed.

My invention comprehends an arrangement wherein a top follower in the form of a housing may afford spaced V-shaped internal friction surfaces, a bottom follower in telescoping arrangement with said top follower affording diagonally arranged seats for friction shoes which may be positioned between adjacent walls of said followers and urged into engagement with said walls by resilient means associated with the respective friction shoes.

In the drawings,

Figure 3 is a further sectional view taken in the vertical longitudinal planes indicated by the line 3—3 of Figure 1.

Figures 4 and 5 show in reduced size my novel bottom follower, Figure 4 being a top plan view thereof, and Figure 5 a side elevation half in section, with the section taken along the vertical plane indicated by the line 5—5 of Figure 4.

Figures 6 and 7 illustrate in reduced size my novel form of top follower, Figure 6 being a top plan view thereof, and Figure 7 a side elevation.

Figures 8 and 9 illustrate my novel form of friction shoe in reduced size, Figure 8 being a top plan view thereof, and Figure 9 a section taken substantially in the transverse vertical plane bisecting said shoe as indicated by the line 9—9 of Figure 8.

Figure 1:
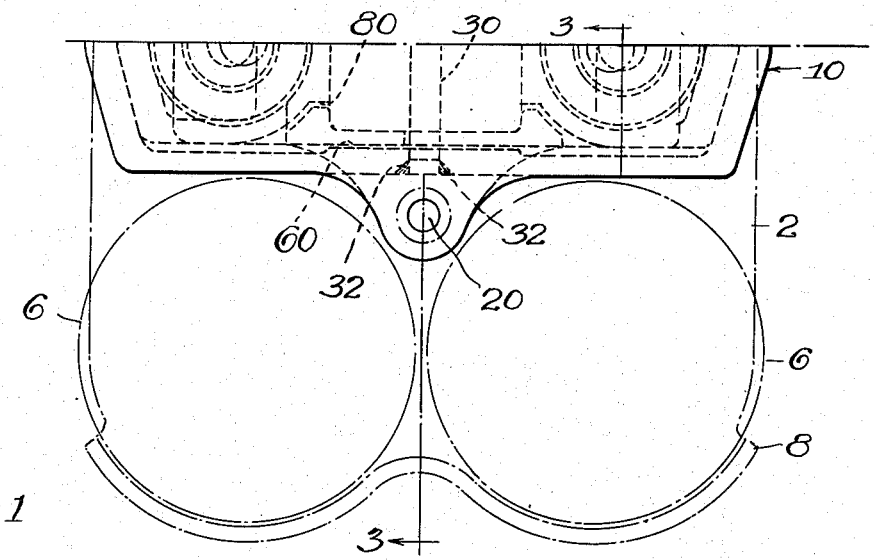
Figure 1 is a half top plan view of a spring group embodying my invention, only one-half of the device being shown inasmuch as the arrangement is symmetrical.

While I have illustrated the device with the outer housing at the top and the inner housing at the bottom, it will readily be understood by those skilled in the art that the device will operate equally well if the position of these followers is inverted. In other words, the spring group functions in similar manner whether the outer housing is shown as a top or bottom follower.

Describing the structure in detail, the embodiment illustrated comprises a top spring plate 2, a bottom spring plate 4 arranged for reception therebetween of a plurality of coil springs 6, 6 at each end of the group, which may be positioned by means of inturned flanges 8, 8 formed on said plates, as well as a friction device centrally positioned with respect to said springs and generally designated 10. Each of said spring plates may be formed with projecting lugs 12, 12 which may serve as positioning means for the group.

The friction device may comprise a top follower 14 of box-like form having the flat base 16 of generally rectangular form with the securing lugs 18, 18 projecting at opposite edges thereof for riveting as at 20, 20 to the adjacent spring plate. Said top follower may have parallel side walls 22, 22 and V-shaped end walls 24, 24 presenting on their inner surfaces V-shaped friction faces 26, 26 (Figure 2), each of said walls 24, 24 being relieved as at 27 (Figure 2) above the friction surface 26 to prevent the formation of wear shoulders thereon. Aligned openings 28, 28 may be centrally formed in the respective side walls for reception of the pin 30 which may be welded as at 32, 32 (Figure 1) and serve to maintain the parts in normal operating position after assembly by affording abutment as at 34 (Figure 2) for the top wall 36 of the bottom follower generally designated 38.

The follower 38 may be of skeletal structure having a top wall 36 of the form best seen in the top plan view of Figure 4 wherein may be noted the arcuate edges 42, 42 at opposite ends thereof for accommodation of the adjacently positioned coil springs 44, 44. Said follower 38 may also have vertical side walls 46, 46 widened adjacent their lower ends in a tapering form to merge with the bottom wall 48, and integrally formed with said bottom wall and side walls at each end of said follower may be the diagonally arranged wall or ledge 50 affording on its upper surface a seat as at 52 for the adjacent friction shoe 54. In each side wall 46 may be formed a vertical slot 56 within which may be received the before-mentioned securing pin 30, as well illustrated in the view of Figure 2. Projecting from the bottom wall 48 at the lateral edges thereof may be the positioning lugs 58, 58. When in assembled relationship, the side walls of the follower 38 may have guiding engagement as at 60 (Figures 1 and 3) with the raised pads 62, 62 formed on the adjacent side walls of the follower 14.

Figure 2:
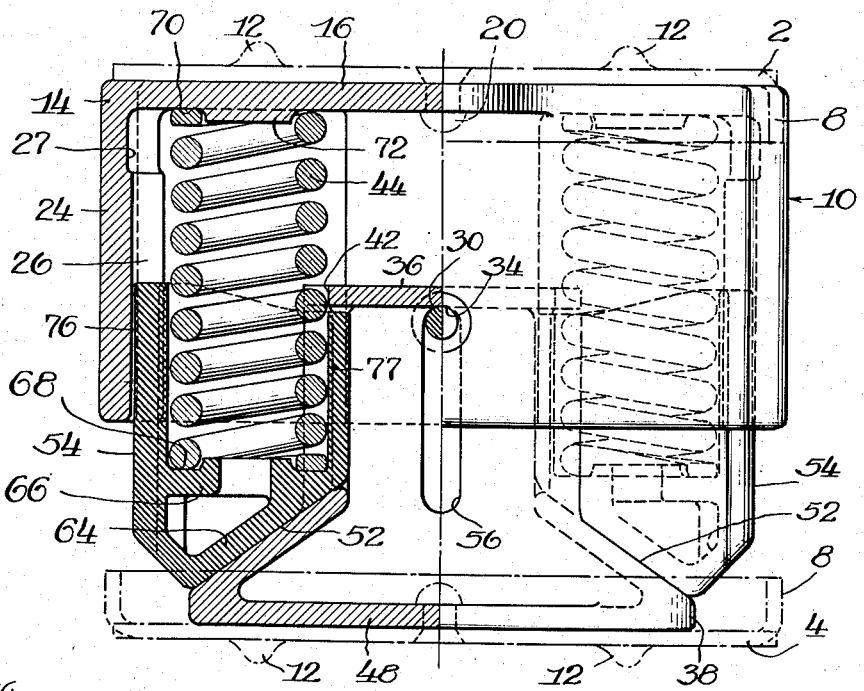
Figure 2 is an end view of the structure shown in Figure 1, taken from the bottom as seen therein, the right half of Figure 2 being an elevation, and the left half thereof in section, with the section taken along the vertical plane bisecting the device transversely.

As well seen in the view of Figure 2, a friction shoe 54 is positioned at each end of the friction device, the diagonal bottom wall 64 of the shoe being seated as at 52 against the adjacent ledge 50 of the follower 38. The shoe itself may be a cup-like structure with the horizontal wall 66 adjacent its lower end affording a seat as at 68 for the adjacent spring 44 which thus may be partially housed within said shoe, the opposite end extending therefrom to seat as at 70 against the top wall 16 of the follower 10 and being positioned with respect thereto by means of the lug 72 formed on said top wall. Each friction shoe may have at one side thereof a V-shaped wall 74 (Figures 8 and 9) complementary in form to the wall 24 of the top follower against which it may be seated, slight clearance being afforded at the apex of said V as seen at 76 (Figure 2) in order to accommodate true seating therealong. At the back of the shoe, opposite the V-shaped friction wall 74 thereof and along opposite edges of the wall 77, may be formed the vertical shoulders 78, 78 (Figure 8) which may have guiding engagement as at 80 (Figure 1) with adjacent vertical shoulders 82, 82 (Figure 4) formed on the side walls of the bottom follower. The side walls of the cup-like friction shoe may be somewhat arcuate in form as best seen in the top plan view of Figure 8, to conform to the spring 41 which may be partially housed therein.

In operation it will be understood that as the friction device is telescoped, each spring 44 will be compressed, thus urging the adjacent friction shoe 54 downwardly along the inclined wall at 52, resulting in increased pressure of the friction face of the friction shoe along the friction surface 26 of the top follower. Only slight movement of the friction shoe is afforded along the seat at 52, but sufficient play is afforded in order to permit the spring 44 to operate effectively as a means of urging the shoe into frictional engagement with the adjacent friction face of the top follower. As the device is released its expansion is limited by the pin 30 as already described.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A spring group comprising top and bottom plates, a coil spring and a friction device between said plates, said friction device having top and bottom followers secured respectively to said plates, said top follower presenting inner vertical friction faces at opposite ends thereof, friction shoes having friction surfaces in complementary engagement with said faces respectively, said bottom follower having engagement with said shoes along diverging diagonal planes, resilient means operative to urge each shoe along the adjacent plane and into engagement with the adjacent friction face, each of said resilient means being compressed between said top follower and the adjacent shoe, and means secured to opposite walls of said top follower and extending through side walls of said bottom follower for retaining said device in assembled relationship.

2. In a spring group, spaced spring plates, coil springs positioned therebetween at opposite ends of said group and a friction device between said plates intermediate said springs with top and bottom followers secured respectively to said plates, said device comprising a housing follower presenting vertical friction faces at opposite ends thereof, a telescoping follower presenting diagonal walls affording friction shoe seats, shoes on said seats having friction surfaces in complementary engagement with said faces, resilient means compressed between each shoe and said top follower and operative to urge said shoe into engagement with both of said followers, and means secured to opposite walls of said housing follower and extending through said telescoping follower for retaining said device in assembled relationship.

3. In a spring group, spaced spring plates, coil springs positioned therebetween at opposite ends of said group and a friction device between said plates intermediate said springs with top and bottom followers secured respectively to said plates, said device comprising a housing follower presenting internal friction faces at opposite ends thereof, a telescoping follower presenting diagonal walls affording friction shoe seats, shoes on said seats having friction surfaces in complementary engagement with said faces, resilient means compressed between each shoe and said top follower, and means secured to opposite walls of said housing follower and extending through said telescoping follower for retaining said device in assembled relationship.

4. A spring group comprising top and bottom plates, a coil spring and a friction device between said plates, said friction device having top and bottom followers secured respectively to said plates, said top follower presenting inner vertical friction faces at opposite ends thereof, friction shoes having friction surfaces in complementary engagement with said faces respectively, said bottom follower having engagement with said shoes along diverging diagonal planes, resilient means bearing against said top follower and operative to urge each shoe along the adjacent plane and into engagement with the adjacent friction face, and means secured to opposite walls of said top follower and extending through side walls of said bottom follower for retaining said device in assembled relationship.

5. A spring group comprising top and bottom plates, a coil spring and a friction device between said plates, said friction device having top and bottom followers secured respectively to said plates, said top follower presenting inner vertical friction faces at opposite ends thereof, friction shoes having friction surfaces in complementary engagement with said faces respectively, said bottom follower having engagement with said shoes along diverging diagonal planes, and resilient means operative to urge each shoe along the adjacent plane and into engagement with the adjacent friction face, each of said resilient means being compressed between said top follower and the adjacent shoe and having a substantial portion thereof housed within the adjacent shoe, each of said shoes having spaced parallel means in guiding engagement with spaced walls of said bottom follower.

6. A friction device comprising top and bottom followers, said top follower presenting at opposite ends thereof V-shaped friction faces, said bottom follower having at opposite ends thereof inclined friction surfaces, a friction shoe at each end of said device engaging the adjacent face and surface, resilient means compressed between said shoe and said top follower, spaced parallel guide means on each shoe engaging said bottom follower, and means secured between spaced walls of said top follower and extending through said bottom follower for limiting the expansion of said device, each of said shoes having a cuplike form affording a seat for the adjacent resilient means near the bottom thereof and housing a substantial portion of said resilient means.

7. A spring group comprising top and bottom plates, a coil spring and a friction device between said plates, said friction device having top and bottom followers secured respectively to said plates, said top follower presenting inner vertical V-shaped friction faces at opposite ends thereof, shoes having friction surfaces in complementary engagement with said faces respectively, said bottom follower having engagement with said shoes along diverging diagonally arranged planes, and resilient means compressed between each shoe and said top follower and operative to urge each shoe along the adjacent plane and into engagement with the adjacent friction face, each of said shoes having spaced parallel positioning means in guiding engagement with spaced walls of said bottom follower.

8. In a spring group, spaced spring plates, coil springs positioned therebetween at opposite ends of said group and a friction device between said plates intermediate said springs with top and bottom followers secured respectively to said plates, said device comprising a housing follower presenting internal vertical friction faces at opposite ends thereof, a telescoping follower presenting diagonal walls affording friction shoe seats, shoes on said seats having friction surfaces in complementary engagement with said faces, spaced parallel positioning means on each shoe having guiding engagement with other walls of said telescoping follower, and resilient means compressed between each shoe and said top follower and operative to urge said shoe into engagement with both of said followers, each of said resilient means having a substantial portion of its length housed within the adjacent shoe and being seated against said adjacent shoe along a horizontal wall intermediate the ends thereof.

9. A friction device comprising top and bottom followers, vertical friction faces at opposite ends of said top follower, diagonal friction surfaces at opposite ends of said bottom follower, a friction shoe at each end of said device engaging the adjacent face and surface, resilient means compressed between said shoe and said top follower and operative to urge said shoe into engagement with both of said followers, and spaced parallel guide means on each shoe engaging said bottom follower.

10. In a spring group, spaced spring plates, coil springs positioned therebetween at opposite ends of said group and a friction device between said plates intermediate said springs with top and bottom followers secured respectively to said plates, said device comprising a housing follower presenting internal vertical V-shaped friction faces at opposite ends thereof, a telescoping follower presenting diagonal walls affording friction shoe seats, hollow shoes on said seats having friction surfaces in complementary engagement with said faces, guide means on each shoe spaced from the friction faces thereof and having engagement with said telescoping follower, and resilient means bearing against said top follower and extending within each shoe and seated adjacent the bottom thereof and operative to urge said shoe into engagement with both of said followers.

11. In a spring group, top and bottom spring plates, a coil spring and a friction device therebetween, said device having opposed followers secured respectively to said plates, one of said followers presenting at opposite ends thereof vertical V-shaped friction faces, the other of said followers having a vertical central portion and presenting at opposite ends thereof inclined walls affording seats for friction shoes, hollow shoes on said seats with friction surfaces in engagement with said faces respectively, and resilient means partially housed in each shoe and seated adjacent the base thereof and compressed between said shoe and said one follower and operative to urge said shoe into engagement with both of said followers, and spaced parallel means on each of said shoes in guiding engagement with walls of said vertical portion.

12. A friction device comprising opposed followers, one of said followers presenting at opposite ends thereof vertical friction faces, the other of said followers having a vertical central portion and presenting at opposite ends thereof inclined walls affording seats for friction shoes, shoes on said seats with friction surfaces in engagement with said faces respectively, resilient means compressed between each of said shoes and said one follower and operative to urge said shoes into engagement with both of said followers, and spaced parallel means on each of said shoes in guiding engagement with said vertical portion.

CARL A. EDSTROM.